United States Patent
Liu (10) Patent No.: US 7,932,708 B2
(45) Date of Patent: Apr. 26, 2011

(54) POWER CONVERTER

(75) Inventor: Doung-Yi Liu, Miaoli County (TW)

(73) Assignee: Nuvoton Technology Corporation, Hsinchu (TW)

( * ) Notice: Subject to any disclaimer, the term of this patent is extended or adjusted under 35 U.S.C. 154(b) by 331 days.

(21) Appl. No.: 12/352,614

(22) Filed: Jan. 13, 2009

(65) Prior Publication Data
US 2010/0176787 A1 Jul. 15, 2010

(51) Int. Cl.
*G05F 1/46* (2006.01)
*H02M 3/156* (2006.01)
(52) U.S. Cl. ......... 323/283; 323/351
(58) Field of Classification Search .......... 323/223, 323/224, 282, 283, 351, 901
See application file for complete search history.

(56) References Cited

U.S. PATENT DOCUMENTS

| | | | | |
|---|---|---|---|---|
| 4,685,040 A * | 8/1987 | Steigerwald et al. | | 363/17 |
| 7,304,870 B2 * | 12/2007 | Strijker et al. | | 363/56.11 |
| 7,492,619 B2 * | 2/2009 | Ye et al. | | 363/97 |
| 7,554,399 B1 * | 6/2009 | Gaboriau et al. | | 330/251 |
| 7,622,827 B2 * | 11/2009 | Yang et al. | | 307/112 |
| 7,646,382 B2 * | 1/2010 | Chapuis et al. | | 345/211 |
| 7,759,902 B2 * | 7/2010 | Gangsto et al. | | 320/134 |

* cited by examiner

*Primary Examiner* — Gary L Laxton
(74) *Attorney, Agent, or Firm* — Jianq Chyun IP Office (57) ABSTRACT

A power converter is provided. The power converter comprises an output pin having an address setting function, for flexibly setting a system management bus (SMBus) slave address. As such, the present invention is adapted for saving the amount of the strapping pins employed in the power converter, and thus saving the IC packaging cost.

16 Claims, 5 Drawing Sheets

FIG. 1 (PRIOR ART)

| ADDRn ~ ADDR0 | Address Selection |
|---|---|
| ...000 | Address 1 |
| ...001 | Address 2 |
| ...010 | Address 3 |
| ...011 | Address 4 |

| Resistance Value Range of R1 or R2 | Voltage Range of Sampling Current Flowing By R1 or R2 | Selected Address |
|---|---|---|
| 3.3~11.6 kΩ | 100~350 mV | 0x01h |
| 11.6~20 kΩ | 350~600 mV | 0x02h |
| 20~28.3 kΩ | 600~850 mV | 0x03h |
| 28.3~36.6 kΩ | 850~1100 mV | 0x04h |
| 36.6~45 kΩ | 1100~1350 mV | 0x05h |
| No Resistance |  | 0x06h |

POWER CONVERTER

BACKGROUND OF THE INVENTION

1. Field of the Invention

The present invention generally relates to a power converter, and more particularly, to a power converter having multifunctional pins. The multifunctional pins are adapted for identifying the setting of a slave address of a system management bus (SMBus).

2. Description of Related Art

Figure 1:
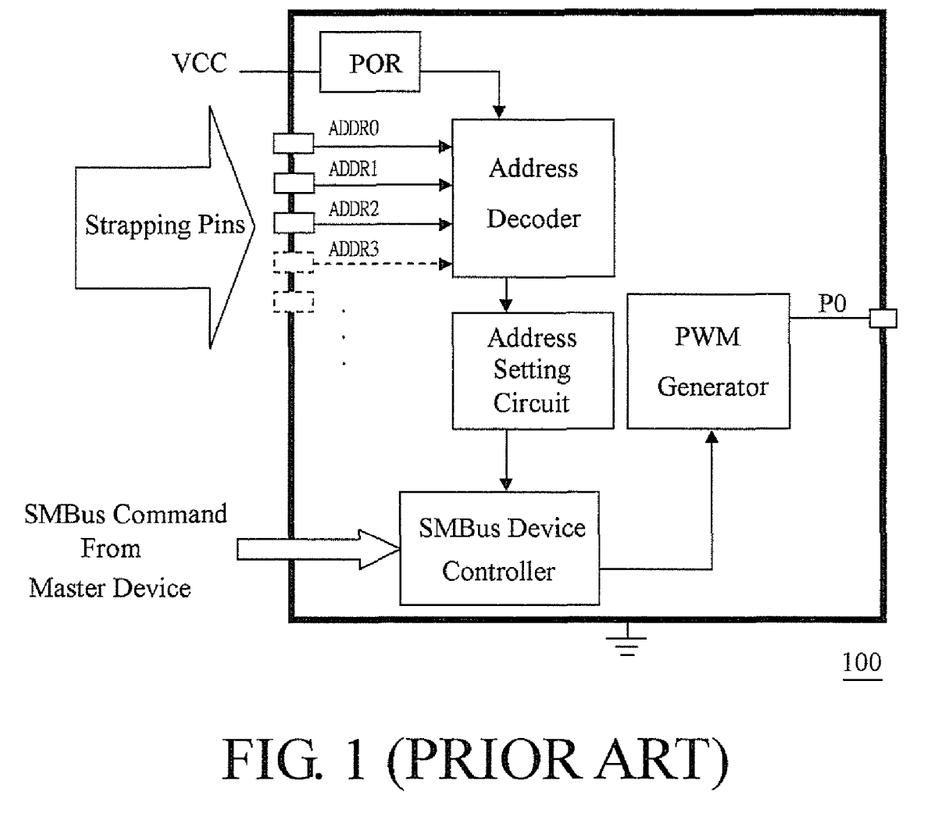
FIG. 1 is a circuit block diagram illustrating a conventional power converter.
Figure 2:
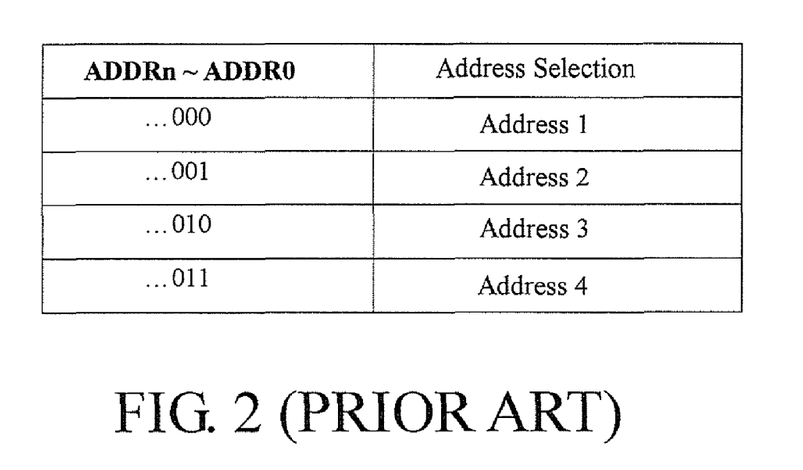
FIG. 2 is a correlation table depicting slave addresses of the SMBus which uses strapping pins for setting the power converter.

An SMBus is often required by a pulse width modulation (PWM) power converter for performing power management. FIG. 1 is a circuit block diagram illustrating a conventional power converter 100. Currently, when applying in an interface having an SMBus, a buck PWM power stage often requires additional strapping pins. For example, as shown in FIG. 1, the power converter 100 requires strapping pins ADDR0, ADDR1, ADDR2, ADDR3... for setting an SMBus slave address, so as to achieve the object of voltage management. In view of the SMBus transmission protocol, the power converter 100 is a slave device, and thus should be given with a slave address for communicating with a master device. Referring to FIG. 2, there is shown a correlation table depicting slave addresses of the SMBus which uses strapping pins for setting the power converter 100.

It can be concluded from the conventional techniques as shown in FIGS. 1 and 2 that the conventional power converter 100 uses a plurality of strapping pins for setting a salve address of the SMBus. The slave address is set by employing a resistance to pull high or pull low a logic status, thus selecting the address of the SMBus by permutations and combinations of 0 and 1 of the strapping pins ADDR0 through ADDRn, in which n is an integer greater than 1.

The conventional approach of setting the SMBus slave address has the following disadvantages. First, it requires for at least one strapping pin, and when the address is desired to be selected with more flexibility, more strapping pins are required. When more strapping pins are employed, the packaging cost for the integrated circuit (IC) inevitably increases in accordance with the amount of the increased strapping pins. Further, when more addresses are demanded, more strapping pins are required. This raises problems of amount of pulling out strapping pins and the corresponding packaging cost for semiconductor manufacturers. Restricted by the IC package, current electronic products are designed to be thinner, lighter, shorter and smaller, and therefore it is now more desirable and even becomes a development strategy for the semiconductor manufacturers to reduce the amount of IC pins employed for the power converter than ever before.

SUMMARY OF THE INVENTION

Accordingly, the present invention is directed to provide a power converter, for reducing the amount of strapping pins employed in conventional power converters. The power converter is adapted for setting a slave address of a system management bus (SMBus).

The present invention is further directed to provide a power converter. The power converter is adapted for achieving a multi-sectional address setting by utilizing existing pins in combination with the function of setting address without employing additional pins, thus saving the total amount of pins used therein and the IC packaging cost thereof.

The present invention provides a power converter. The power converter includes a delay control circuit, a power on reset (POR) circuit, a power width modulation (PWM) generator, a voltage sampling circuit, an analog-to-digital converter (ADC), an address setting circuit, and an SMBus slave device controller. The POR circuit is adapted for receiving a power supply voltage for turning on the power converter, and enabling the delay control circuit for setting a sampling time. The PWM generator includes an output pin. The PWM generator is coupled to the delay control circuit. The output pin is coupled to a resistance. During the sampling time, the PWM generator suspends outputting signals, and a sampling current source outputs a sampling current to the resistance. The voltage sampling circuit detects a voltage level of the output pin during the sampling time. The ADC is coupled to the voltage sampling circuit for receiving the voltage level and converting the voltage level into an address selection signal. The address setting circuit is coupled to the ADC for receiving the address selection signal, and determining a setting of an SMBus slave address according to the address selection signal. The SMBus slave device controller is coupled to the address setting circuit for receiving the setting of the SMBus slave address, and latching up the setting of the SMBus slave address, for subsequently communicating data with an SMBus master device controller. When the sampling time terminates and the setting of the SMBus slave address is completed, the PWM generator outputs a PWM signal from the output pin.

In an embodiment of the power converter according to the present invention, the resistance is provided for allowing the power converter to identify the setting of the SMBus slave address.

In an embodiment of the power converter according to the present invention, when the power supply voltage received by the POR circuit reaches a power supply level for starting a circuit, the POR circuit resets the entire circuit of the power converter to start working.

In an embodiment of the power converter according to the present invention, the setting of the SMBus slave address is determined according to the voltage level.

In an embodiment of the power converter according to the present invention, the sampling current is a fixed current.

In an embodiment of the power converter according to the present invention, the address setting circuit previously determines a mapping table of voltage values and corresponding address settings. The mapping table contains a plurality of optional address settings.

In an embodiment of the power converter according to the present invention, when a resolution of the voltage sampling circuit increases, an amount of the optional address settings correspondingly increases.

Viewing from another aspect of the invention, the present invention further provides a power converter. The power converter includes a delay control circuit, a power on reset (POR) circuit, a power width modulation (PWM) generator, a voltage sampling circuit, an analog-to-digital converter (ADC), an address setting circuit, and an SMBus slave device controller. The POR circuit is adapted for receiving a first power supply voltage for turning on the power converter, enabling the delay control circuit and setting a sampling time. The PWM generator includes a first output pin and a second output pin. The PWM generator is coupled to the delay control circuit. The first output pin is coupled to a gate of a first transistor. The second output pin is coupled to a gate of a second transistor. The first transistor is coupled to a second power supply voltage and is serially connected with the second transistor. One of the first transistor and the second transistor is coupled to a resistance. During the sampling time, the PWM generator suspends outputting signals, and a sampling current source outputs a sampling current to the resistance. The voltage sampling circuit detects a voltage level of one of the first output pin and the second output pin during the sampling time. The ADC is coupled to the voltage sampling circuit for receiving the voltage level and converting the voltage level into an address selection signal. The address setting circuit is coupled to the ADC for receiving the address selection signal, and determining a setting of an SMBus slave address according to the address selection signal. The SMBus slave device controller is coupled to the address setting circuit for receiving the setting of the SMBus slave address, and latching up the setting of the SMBus slave address, for subsequently communicating data with an SMBus master device controller. When the sampling time terminates and the setting of the SMBus slave address is completed, the PWM generator outputs a PWM signal from where the first transistor couples with the second transistor.

In an embodiment of the power converter according to the present invention, the power converter further includes a positive voltage clamp circuit. During the sampling time, the positive voltage clamp circuit is coupled to the first output pin for clamping an upper limit of the voltage level during the sampling time.

In an embodiment of the power converter according to the present invention, the first output pin is an upper gate pin (UGATE), and the second output pin is a lower gate pin (LGATE).

In summary, the present invention utilizes the output pin(s) facilitated with the address setting function, for flexibly setting the SMBus slave address, thus employing less strapping pins of conventional power converters. In such a way, the present invention is adapted for overcoming the restriction of the IC packaging and saving the packaging cost. Further, the embodiments of the present invention have at least the following advantages:

1. don't need additional pins; and
2. when more addresses are demanded, multi-sectional address setting can be achieved by varying the voltage sampling circuit and the resolution of the ADC.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts. When an element is described as connected to or coupled to another element, the element should be construed as either directly connected to or coupled to the another element, or indirectly connected to or coupled to the other element (i.e., there is one or more other element existing between the element and the another element). Otherwise, when an element is described as directly connected to or coupled to another element, there is no any other element existing therebetween.

Figure 3:
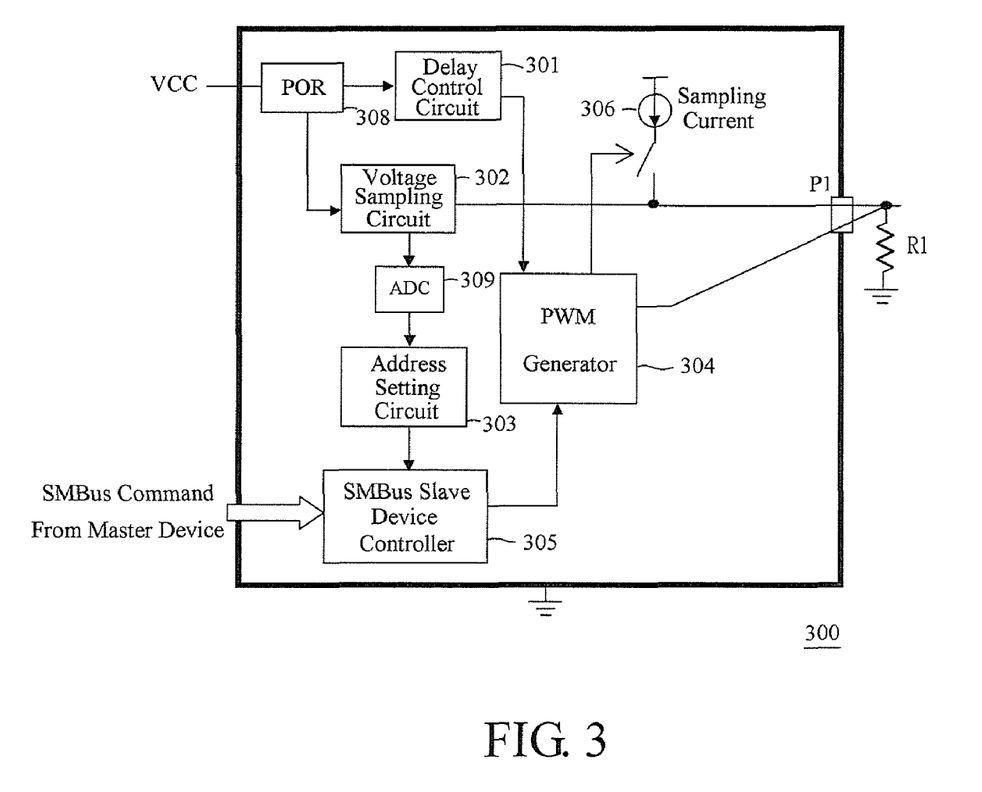
FIG. 3 is a circuit block diagram illustrating a power converter according to an embodiment of the present invention.

FIG. 3 is a circuit block diagram illustrating a power converter according to an embodiment of the present invention. Referring to FIG. 3, it shows a power converter 300. The power converter 300 includes a power on reset (POR) circuit 308, a delay control circuit 301, a voltage sampling circuit 302, an analog-to-digital converter (ADC) 309, an address setting circuit 303, a pulse width modulation (PWM) generator 304, and a system management Bus (SMBus) slave device controller 305.

According to the embodiment of the present invention, the POR circuit 308 can be used for receiving a power supply voltage VCC, subsequently turning on the operation of the power converter 300, and enabling the delay control circuit 301 for setting a sampling time. The PWM generator 304 includes an output pin P1. The PWM generator 304 is coupled to the delay control circuit 301. The output pin P1 is coupled to a resistance R1. During the sampling time, the PWM generator 304 suspends outputting signals, and a sampling current source 306 outputs a sampling current to the resistance R1. In other words, when the power supply voltage VCC is being received, the PWM generator stops outputting PWM signals, and allows the rest to execute the sampling operation.

The sampling operation is to be discussed in more details herebelow. In the sampling time, the voltage sampling circuit 302 detects a voltage level of the output pin P1. The ADC 309 is coupled to the voltage sampling circuit 302 for receiving the voltage level of the output pin P1, and converting the received voltage level into an address selection signal. The address setting circuit 303 is coupled to the ADC 309 for receiving the address selection signal, and determining a setting of an SMBus slave address according to the address selection signal. The SMBus slave device controller 305 is coupled to the address setting circuit 303, for receiving the setting of the SMBus slave address and latching up the setting of the SMBus slave address, for subsequently communicating data with an SMBus master device controller.

When the sampling operation terminates and the setting of the SMBus slave address is completed, the PWM generator 304 outputs a PWM signal via the output pin P1.

In view of the foregoing embodiment as discussed above, those having ordinary skill in the art should be aware of that the power converter 300 of the embodiment does not require any additional strapping pin, and the driving pin of the power converter 300 has the function of setting address. Therefore, the power converter 300 is adapted for setting the SMBus slave address with strapping pins less than conventional power converters.

Figure 4:
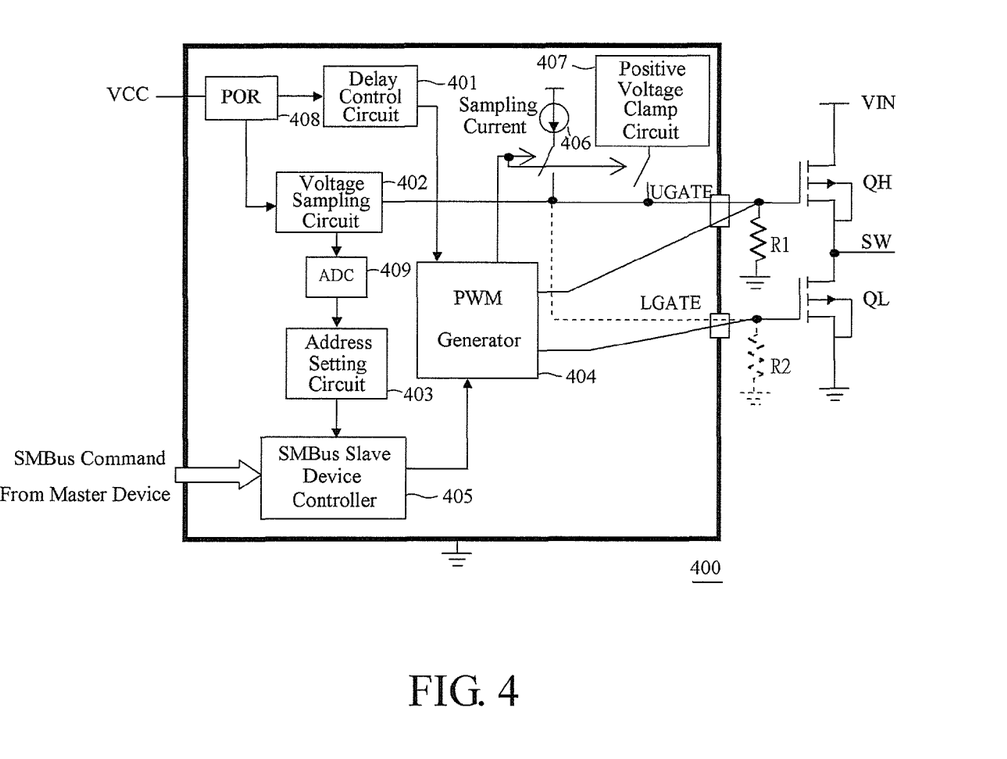
FIG. 4 is a circuit block diagram illustrating a power converter according to a further embodiment of the present invention.

FIG. 4 is a circuit block diagram illustrating a power converter 400 according to a further embodiment of the present invention. Referring to FIG. 4, the power converter 400 includes a POR circuit 408, a delay control circuit 401, a voltage sampling circuit 402, an ADC 409, an address setting circuit 403, a PWM generator 404, and an SMBus slave device controller 405.

First, the PWM generator 404 includes a first output pin UGATE and a second output pin LGATE. Therefore, the SMBus slave address can be set by coupling a resistance R1 to the first output gate UGATE or coupling a resistance R2 to the second output pin LGATE. In other words, the embodiment only requires one of the resistances R1 and R2 correspondingly being coupled to the corresponding output pin.

Specifically, the PWM generator 404 is coupled to the delay control circuit 401. The first output pin UGATE is coupled to a gate of a first transistor QH, and the second output pin LGATE is coupled to a gate of a second transistor QL. The first transistor QH is coupled to a second power supply voltage VIN and is serially connected with the second transistor QL. One of the first output pin UGATE and the second output pin LGATE is coupled to a resistance. During a sampling time, the PWM generator 404 suspends outputting signals, and the sampling current source 406 outputs a sampling current to the resistance.

The POR circuit 408 is adapted for receiving a first power supply voltage VCC for turning on the power converter 400, enabling the delay control circuit 401 and setting a sampling time. The sampling current source outputs the sampling current to the resistance, and therefore the voltage sampling circuit 402 can detect a voltage level of the one of the first output pin UGATE and the second output pin LGATE during the sampling time. The ADC 409 is coupled to the voltage sampling circuit 402 for receiving the voltage level, and converting the voltage level into an address selection signal. The address setting circuit 403 is coupled to the ADC 409 and is adapted for receiving the address selection signal, and is further adapted for determining a setting of the SMBus slave address according to the address selection signal. The SMBus slave device controller 405 is coupled to the address setting circuit 403 for receiving the setting of the SMBus slave address and latching up the setting of the SMBus slave address, for subsequently communicating data with a master device controller of the SMBus.

When the sampling operation terminates and the setting of the SMBus slave address is completed, the PWM generator 404 outputs a PWM signal to an external circuit (not shown in the drawings) from where the first transistor QH couples with the second transistor QL.

Further, in the power converter as shown in FIG. 3 or FIG. 4, when the power supply voltage VCC received by the POR circuit reaches a power supply level for starting a circuit, that indicates that a power supply is ready for operation. Therefore, the POR circuit resets the entire circuit of the power converter to start working.

It should be noted that the resistance R1 is provided for allowing the power converter to identify the setting of the SMBus slave address. The setting of the SMBus slave address is determined by the voltage level. In accordance with the principle of voltage dropping, voltage=current×resistance, the sampling current is a fixed current. As such, when a larger resistance R1 is provided, a higher voltage level of the output pin P1 would be obtained, and correspondingly, when a smaller resistance R1 is provided, a lower voltage level of the output pin P1 would be obtained.

Figure 5:
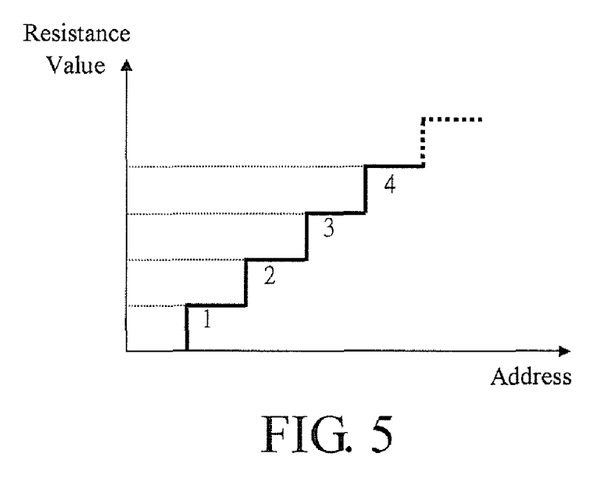
FIG. 5 depicts a corresponding relationship between addresses and resistances.
Figure 6:
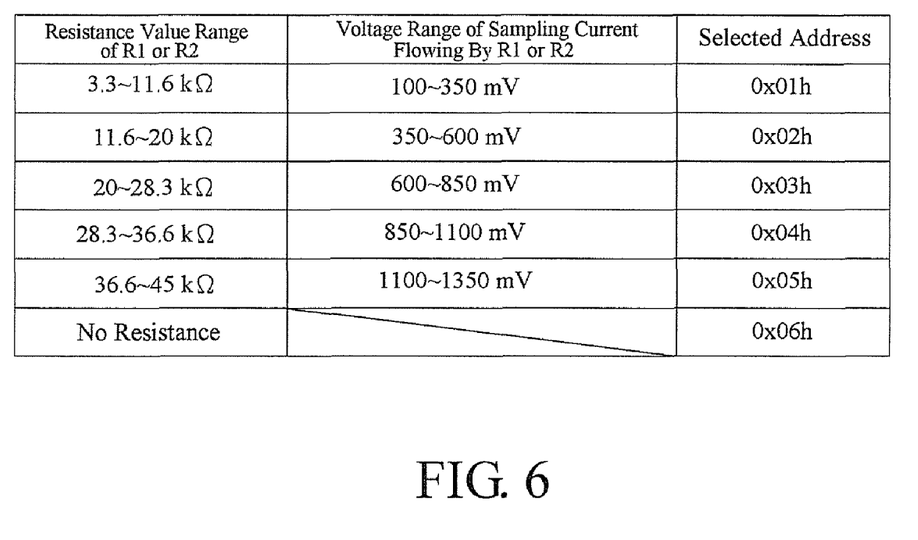
FIG. 6 depicts a mapping relationship of addresses to resistances.

In order to achieve a multi-sectional address design of the address setting circuit 303 or 403, a mapping table of voltage values and corresponding address settings can be previously determined and provided. The mapping table is designed as shown in FIGS. 5 and 6. FIG. 5 depicts a corresponding relationship between addresses and resistances. FIG. 6 depicts a mapping relationship of addresses to resistances. Referring to FIG. 5, the numerals 1, 2, 3, 4 presented therein represent the selected addresses of 0x01h, 0x02h, 0x03h, 0x04h, and resistance ranges and voltage ranges correspondingly thereto, respectively. Different resistances correspondingly cause different voltage drops. As such, the value of the voltage drop can be determined by the voltage sampling circuit, and thereafter the ADC outputs a digital signal, i.e., the address selection signal, corresponding to the address setting circuit, and thus a specific address can be selected. Those skilled in the art should understand that the design of the multi-sectional address can be realized in many other ways in accordance with the spirit of the present invention, and should not be restricted by the embodiment discussed above.

When the voltage sampling circuit 302 or 402 is designed with a higher resolution, more optional address settings are correspondingly provided for selection. Further, the value of the resistance correspondingly affects the voltage level, it is preferred not to select a threshold value when selecting the resistance value to be provided. For example, when selecting a the 0x01h address, the selected resistance R1 or R2 are preferred to be within a range of 3.3KΩ to 11.6KΩ, e.g., 6.8KΩ. This is helpful for preventing address sampling failures.

Referring to FIG. 4 again, at the beginning of providing the supply voltage VCC, a little delay time is applied to control and delay switching the output of the PWM generator 304. In this case, the first output pin UGATE is internally at a high impedance status. Therefore, because of the resistance R1 coupled to the first output pin UGATE, a sampling current flows by the resistance R1 and generates a voltage drop thereby. Different resistance values cause different voltage drops. When the resistance R1 has too large a resistance value, or there is no resistance R1 provided therein at all, the sampling current may undesirably conduct the first transistor QH. For avoiding this undesired conducting of the first transistor QH, the power converter 400 can preferably further includes a positive voltage clamp circuit 407. During the sampling time, the positive voltage clamp circuit 407 is coupled to the first output pin UGATE, for clamping an upper limit of the voltage level of the resistance R1, thus restricting the voltage level of the first output pin UGATE to be lower than a voltage level for conducting the first transistor QH.

Figure 7:
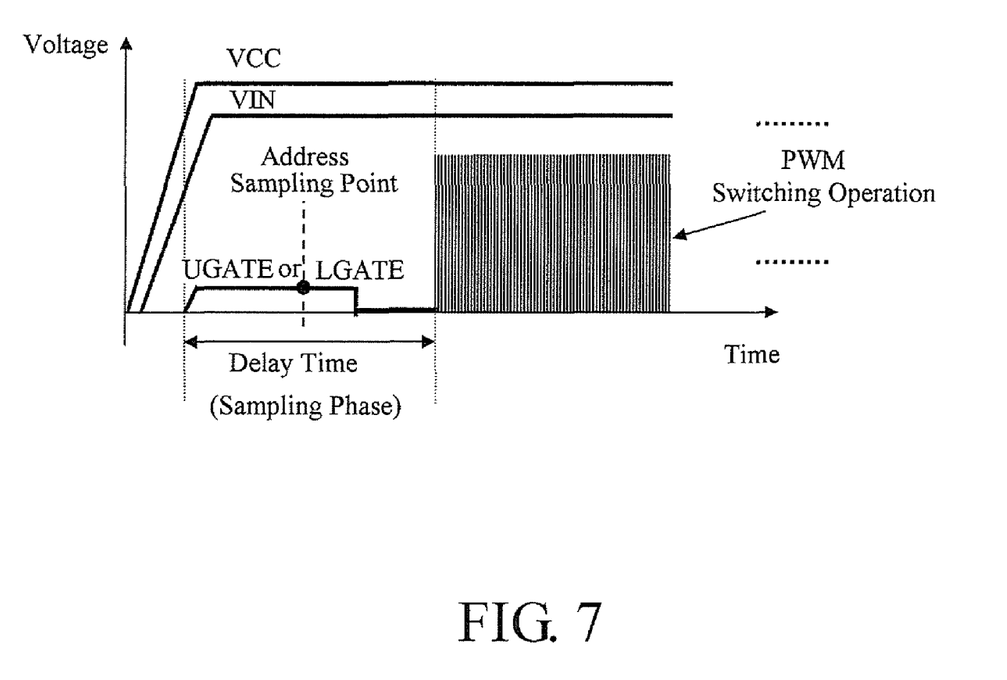
FIG. 7 is a schematic diagram illustrating address sampling points according to an embodiment of the present invention.

FIG. 7 is a schematic diagram illustrating address sampling points according to an embodiment of the present invention. Referring to FIG. 7, after the sampling phase (i.e., sampling operation) is completed, the PWM generator inside the power converter must output a PWM signal to control the power transistors QH and QL of the output pins UGATE and LGATE, respectively. Because the resistance R1 or R2 is coupled to the output pin UGATE or LGATE, when the PWM signal is outputted, more or less current leakage inevitably occurs at the resistance R1 or R2.

As ideally desired, the current leakage can be eliminated to zero by disconnecting the resistance R1 or R2 after the address sampling phase is completed. However, in fact, the PWM signal obtained when the resistance R1 or R2 is disconnected becomes incapable of controlling the power transistors QH and QL. Therefore, the present invention takes the worst situation that may occur in consideration, in which when the resistance R1 or R2 has a minimum resistance value so that the current leakage generated by the PWM signal at the resistance R1 or R2 is the maximum. Taking the aforementioned example of mapping relationship between the addresses and the resistance values as an example again for illustration, the minimum resistance value is 3.3KΩ, in further considering the worst situation and assuming that the voltage amplitude of the PWM signal is 30V, an instant maximum current leakage is 30V/3.3KΩ=9 mA. In such a worst situation, an unnecessary power consumption caused by the current leakage is 0.267 watt. As such, comparing with the power outputted from the power generator which is up to tens of watts, the 0.267 watt of the worst situation seems neglectable.

Another matter that should be further considered is would the provided resistance R1 or R2 affect the PWM signal, or even distort the PWM signal? The answer is that it would not. In accordance with the recent development of power generators, the driving current capability of the PWM signal at the output pin reaches to a level up to 1.5 to 2 A. Therefore, as a comparison, the current leakage which is a current of the tens of mA flowing by the resistance R1 or R2, won't apply any practical affection to the PWM signal.

In summary, in view of all of the discussion of the foregoing embodiments, it can be concluded that the current leakage and power consumption caused by the resistance R1 or R2 employed by the present invention is equivalent to 1% to 2% of the output power of the entire PWM DC/DC converter only, and thus the resistance R1 or R2 provided therein won't cause any negative affection to the PWM signal.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power converter, comprising:
   a delay control circuit;
   a power on reset (POR) circuit, receiving a power supply voltage for turning on the power converter, wherein the POR circuit enables the delay control circuit to operate and set a sampling time;
   a pulse width modulation (PWM) generator, having an output pin, the PWM generator being coupled to the delay control circuit, and the output pin being coupled to a resistance, wherein during the sampling time, the PWM generator suspends outputting signals, and a sampling current source outputs a sampling current to the resistance;
   a voltage sampling circuit, for detecting a voltage level of the output pin during the sampling time;
   an analog-to-digital converter (ADC), coupled to the voltage sampling circuit for receiving the voltage level and converting the received voltage level into an address selection signal;
   an address setting circuit, coupled to the ADC for receiving the address selection signal, and determining a setting of an SMBus slave address according to the address selection signal; and
   an SMBus slave device controller, coupled to the address setting circuit for receiving the setting of the SMBus slave address, and latching up the setting of the SMBus slave address, for subsequently communicating data with an SMBus master device controller,
   wherein when the sampling time terminates and the setting of the SMBus slave address is completed, the PWM generator outputs a PWM signal from the output pin.

2. The power converter according to claim 1, wherein the resistance is provided for allowing the power converter to identify the setting of the SMBus slave address.

3. The power converter according to claim 1, wherein when the power supply voltage received by the POR circuit reaches a power supply level for starting a circuit, the POR circuit resets the entire circuit of the power converter to start working.

4. The power converter according to claim 1, wherein the setting of the SMBus slave address is determined according to the voltage level.

5. The power converter according to claim 1, wherein the sampling current is a fixed current.

6. The power converter according to claim 1, wherein the address setting circuit previously determines a mapping table of voltage values and corresponding address settings, and the mapping table comprises a plurality of optional address settings.

7. The power converter according to claim 1, wherein when a resolution of the voltage sampling circuit increases, an amount of the optional address settings correspondingly increases.

8. A power converter, comprising:
   a delay control circuit;
   a power on reset (POR) circuit, receiving a first power supply voltage for turning on the power converter, wherein the POR circuit enables the delay control circuit to operate and set a sampling time;
   a pulse width modulation (PWM) generator, having a first output pin and a second output pin, the PWM generator being coupled to the delay control circuit, the first output pin being coupled to a gate of a first transistor, the second output pin being coupled to a gate of a second transistor, the first transistor being coupled to a second power supply voltage and being serially connected with the second transistor, and one of the first transistor and the second transistor being coupled to a resistance, wherein during the sampling time, the PWM generator suspends outputting signals, and a sampling current source outputs a sampling current to the resistance;
   a voltage sampling circuit, for detecting a voltage level of one of the first output pin and the second output pin during the sampling time;
   an analog-to-digital converter (ADC), coupled to the voltage sampling circuit for receiving the voltage level and converting the received voltage level into an address selection signal;
   an address setting circuit, coupled to the ADC for receiving the address selection signal, and determining a setting of an SMBus slave address according to the address selection signal; and
   an SMBus slave device controller, coupled to the address setting circuit for receiving the setting of the SMBus slave address, and latching up the setting of the SMBus slave address, for subsequently communicating data with an SMBus master device controller, wherein
   when the sampling time terminates and the setting of the SMBus slave address is completed, the PWM generator outputs a PWM signal from where the first transistor couples with the second transistor.

9. The power converter according to claim 8 further comprising a positive voltage clamp circuit, wherein during the sampling time, the positive voltage clamp circuit is coupled to the first output pin for clamping an upper limit of the voltage level during the sampling time.

10. The power converter according to claim 8, wherein the first output pin is an upper gate pin (UGATE), and the second output pin is a lower gate pin (LGATE).

11. The power converter according to claim 8, wherein the resistance is provided for allowing the power converter to identify the setting of the SMBus slave address.

12. The power converter according to claim 8, wherein when the power supply voltage received by the POR circuit reaches a power supply level for starting a circuit, the POR circuit resets the entire circuit of the power converter to start working.

13. The power converter according to claim 8, wherein the setting of the SMBus slave address is determined according to the voltage level.

14. The power converter according to claim 8, wherein the sampling current is a fixed current.

15. The power converter according to claim 8, wherein the address setting circuit previously determines a mapping table of voltage values and corresponding address settings, and the mapping table comprises a plurality of optional address settings.

16. The power converter according to claim 8, wherein when a resolution of the voltage sampling circuit increases, an amount of the optional address settings correspondingly increases.

* * * * *